3,081,536
METHOD OF SOLDERING TO ALUMINUM

Lawrence D. Favro, Natick, Mass., assignor to Clevite Corporation, Cleveland, Ohio, a corporation of Ohio
No Drawing. Filed Feb. 5, 1959, Ser. No. 791,282
3 Claims. (Cl. 29—495)

This invention relates to methods of soldering aluminum. As used herein "aluminum" is intended to include pure aluminum, aluminum of commercial purity, and alloys comprising high percentages of aluminum.

It is well known that aluminum is one of the most difficult to weld or solder of all the common metals. This stems from the combination of its relatively low melting point with the fact that it is continuously coated with highly refractory aluminum oxide which forms almost instantaneously on aluminum surfaces exposed to air or other oxygen-bearing atmosphere.

To avoid the difficulties in soldering aluminum various special solders and techniques have been developed. The solders commonly employed, for example, zinc-bearing solders, require relatively high temperatures and, all in all, a considerable degree of special skill on the part of the operator.

It is the fundamental object of the present invention to provide novel methods of soldering aluminum which avoid the disadvantages of prior art methods.

More particularly, it is an object of the invention to provide improved methods of soldering aluminum to aluminum or to other metals at low temperatures and with conventional low melting point or "soft" solders.

Another object is the provision of novel methods of soldering aluminum which is quick, simple, economical, and does not require special solders, apparatus, techniques or skills.

These and further objects are accomplished by methods of soldering aluminum according to the invention which comprise the step of applying to the surface of the aluminum just before soldering, a hydroxide solution capable of removing aluminum oxide from the surface.

Additional objects of the invention, its advantages, scope and the manner in which it may be practiced will be apparent to those conversant with the art from the following description and subjoined claims.

The soldering method contemplated makes use of any conventional low temperature solder capable of wetting a virgin aluminum surface. Such solders usually comprise lead, tin and, for certain electrical uses, indium. Specific examples of suitable solders are pure tin; 60/40 or 50/50 tin-lead; and eutectic tin-indium.

Ordinarily, aluminum is not wet by such solders because of the highly-refractory aluminum oxide ($Al_2O_3$) film which coats aluminum almost immediately upon exposure to air or any atmosphere containing free oxygen. According to the present invention, the aluminum coating is removed immediately prior and/or during the soldering operation. This is accomplished by applying to the aluminum surface to be soldered a hydroxide cleaning agent capable of removing the oxide. Alkali metal hydroxides such as sodium hydroxide (NaOH) and potassium hydroxide (KOH) are entirely satisfactory for this purpose.

The hydroxide is applied to the parts to be soldered in the form of an aqueous solution. The solution may be applied before or after heating the part. The concentration of the solution is not critical inasmuch as it rapidly approaches 100% as the applied heat evaporates the water vehicle. However, it is preferable to use a fairly strong solution (e.g., 30 to 40%) in order to accelerate the cleaning action.

After application of the hydroxide solution and with the parts to be joined heated to a suitable temperature, the solder is applied before the solution boils away completely. The temperature should not of course exceed the melting point of the parts being joined and, as a minimum, need only reach the melting point of the particular solder being used. Satisfactory soldering has been achieved with temperatures as low as 120° C.

In the event the hydroxide solution comes in contact with an area of the surface of the parts which is to be subjected to further soldering or welded subsequently, such area should be cleansed of any residue by suitable means such as by dipping in commercial nitric acid.

The method described may be employed to solder aluminum to aluminum or to other metals, e.g., copper, silver, etc.

As a specific example of the method, two nickel plated steel hermetic seal assemblies for semiconductor devices, approximately $3/16$ inch in diameter, were soldered into holes in a pure aluminum transistor mounting base, roughly one inch square by $1/8$ inch thick, with indium-tin eutectic solder at a temperature of 120° C.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by U.S. Letters Patent is:

1. A method of soldering to aluminum comprising: applying to the surface of the parts to be soldered an aqueous solution of an alkali metal hydroxide selected from the group consisting of NaOH and KOH; heating the parts with said solution thereon to a temperature at least as high as the melting point of the solder and below the melting point of the parts; and, before complete evaporation of said solution, applying to the aluminum surface covered with said solution a low melting point solder capable of wetting a virgin aluminum surface.

2. A method according to claim 1 wherein said solder is selected from the group consisting of tin, lead, indium, and binary and ternary alloys thereof.

3. A method according to claim 2 wherein the weight percentage composition of said solution is 30 to 50.

References Cited in the file of this patent
UNITED STATES PATENTS

| | | |
|---|---|---|
| 731,100 | Dick | June 16, 1903 |
| 1,743,615 | Nead et al. | Jan. 14, 1930 |
| 2,169,098 | Howe | Aug. 8, 1939 |
| 2,709,847 | Ihrie et al. | June 7, 1955 |
| 2,715,263 | Mac Gregor | Aug. 16, 1955 |
| 2,751,317 | Orme | June 19, 1956 |
| 2,774,137 | Yarow | Dec. 18, 1956 |
| 2,817,893 | Cunningham et al. | Dec. 31, 1957 |
| 2,875,514 | Doerr | Mar. 3, 1959 |
| 2,966,448 | Connor | Dec. 27, 1960 |

OTHER REFERENCES

How to Weld Aluminum, pamphlet pub. by the Reynolds Metals Co., June 20, 1946, p. 68.